United States Patent
Liu et al.

(10) Patent No.: US 8,476,942 B2
(45) Date of Patent: *Jul. 2, 2013

(54) SUMMATION CIRCUIT IN DC-DC CONVERTER

(75) Inventors: Jun Liu, Shenzhen (CN); Haibo Zhang, Shenzhen (CN)

(73) Assignee: STMicroelectronics (Shenzhen) R&D Co. Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,819

(22) Filed: Aug. 21, 2012

(65) Prior Publication Data
US 2012/0313615 A1 Dec. 13, 2012

Related U.S. Application Data

(63) Continuation of application No. 12/938,150, filed on Nov. 2, 2010, now Pat. No. 8,258,828.

(30) Foreign Application Priority Data

Nov. 10, 2009 (CN) .......................... 2009 1 0208329

(51) Int. Cl.
*H03K 4/90* (2006.01)

(52) U.S. Cl.
USPC ........... 327/132; 327/135; 327/136; 327/137; 327/564

(58) Field of Classification Search
USPC .......................... 327/131, 132, 135–137, 564
See application file for complete search history.

(56) References Cited

PUBLICATIONS

Brooks, Todd L. et al., "FA 14.3: A Low-Power Differential CMOS Bandgap Reference," ISSCC94/Session 14/ Amplifiers/Paper FA 14.3; IEEE International Solid-State Circuits Conference, Feb. 18, 1994, pp. 248-249.

*Primary Examiner* — William Hernandez
(74) *Attorney, Agent, or Firm* — Slater & Matsil, L.L.P.

(57) ABSTRACT

An integrated circuit includes a saw-tooth generator including a saw tooth node configured to have a saw-tooth voltage generated thereon; and a first switch having a first end connected to the saw tooth node. The integrated circuit further includes a second switch coupled between an output node and an electrical ground, wherein the first switch and the second switch are configured to operate synchronously. A first current source is connected to the saw tooth node. A second current source is connected to the output node.

20 Claims, 2 Drawing Sheets

US 8,476,942 B2

SUMMATION CIRCUIT IN DC-DC CONVERTER

This application claims priority to U.S. patent application Ser. No. 12/938,150, filed on Nov. 2, 2010 and entitled "Summation Circuit in DC-DC Converter," and claims priority to China Patent Application Serial No. 200910208329.6, filed on Nov. 10, 2009 and entitled "Summation Circuit in DC-DC Converter," which applications are hereby incorporated by reference to the maximum extent allowable by law.

TECHNICAL FIELD

This invention relates generally to integrated circuits, and more particularly to DC-DC converters, and even more particularly to summation circuits for DC-DC converters.

BACKGROUND

DC-DC converters are commonly used in integrated circuits for providing stable voltages. A DC-DC converter is an electronic circuit that converts a source of direct current from one voltage level to another. For accurate conversion, the output voltage (converted voltage) of the DC-DC converter needs to be sensed, for example, using a current sensing circuit. The resulting current (sensed current) generated by the current sensing circuit is then converted to a voltage, which is further compared with a reference voltage to determine whether the converted voltage is accurate or not, so that the converted voltage can be adjusted. Accordingly, a feedback loop is formed.

The feedback loop used for sensing and adjusting the converted voltage suffers from stability problem. To solve this problem, the voltage generated by the current sensing circuit was conventionally summed with a saw-tooth voltage before being compared with the reference voltage. FIG. 1 illustrates a circuit diagram of a conventional saw-tooth generator and summation circuit. The saw-tooth generator includes operational amplifier OP2', transistor M3', capacitor C', and current source I_Bias', which provides bias current I'. When voltage VA' at node A' is lower than voltage V_reference, operational amplifier OP2' outputs a low voltage, and hence transistor M3' is turned off. Current source I_Bias' then charges capacitor C', and hence voltage VA' increases over time. At the time voltage VA' is equal to or greater than reference voltage V_reference', operational amplifier OP2' outputs a voltage high enough for turning on transistor M3'. Accordingly, node A' is shorted to the electrical ground, and voltage VA' is reduced to the ground voltage. With the positive input receiving voltage VA' at the ground voltage, operational amplifier OP2' outputs a low voltage to turn off transistor M3', and current source I_Bias' charges capacitor C' again. With the above-described cycle repetition, a saw-tooth voltage is generated at node A'.

In the summation circuit, operational amplifier OP1' has a positive input receiving the saw-tooth voltage VA'. The negative input of operational amplifier OP1' is connected to resistor R0', whose resistance is also denoted as R0'. Therefore, current IF, which is equal to VA'/R0', flows through resistor R0', transistor M4', and transistor M1'. Transistor M1' forms a current mirror with transistor M2', and current I2' flowing through transistor M2', resistor R1', and resistor R_sense' is proportional to current I1'. If transistors M1' and M2' are identical, current IF equals current I2'. Current I_sense' is inserted to node B'. Accordingly, the summation voltage V_sum is:

$$V\_sum=(VA'/R0')\times(R1'+R\_sense')+I\_sense'\times R\_sense' \quad [\text{Eq. 1}]$$

Accordingly, through the current summation of currents I2' and current I_sense', the summation voltage V_sum is obtained. Since current+I_sense' represents the converted voltage, summation voltage V_sum represents the sum of the saw tooth voltage and the converted voltage.

SUMMARY

In accordance with one aspect of an embodiment, an integrated circuit includes a saw-tooth generator including a saw tooth node configured to have a saw-tooth voltage generated thereon; and a first switch having a first end connected to the saw tooth node. The integrated circuit further includes a second switch coupled between an output node and an electrical ground, wherein the first switch and the second switch are configured to operate synchronously. A first current source is connected to the saw tooth node. A second current source is connected to the output node.

In accordance with another aspect of an embodiment, an integrated circuit includes an operational amplifier including a positive input, a negative input, and an output; and a first switch having a first control node coupled to the output of the operational amplifier. The first switch is configured to connect the positive input of the operation amplifier to an electrical ground when a voltage at the positive input is higher than a reference voltage at the negative input, and disconnect the positive input of the operation amplifier from the electrical ground when the voltage at the positive input is no higher than the reference voltage. The integrated circuit further includes an output node; and a second switch having a second control node coupled to the output of the operational amplifier. The second switch includes a first end connected to an output node, and a second end connected to the electrical ground. A first constant current source is coupled to the positive input of the operation amplifier. A second constant current source is coupled to the output node. A first capacitor is coupled between the positive input of the operation amplifier and the electrical ground. A second capacitor is coupled between the output node and the electrical ground. A resistor is coupled in series with the second capacitor, wherein the second capacitor and the resistor are coupled between the first end and the second end of the second switch.

In accordance with yet another aspect of an embodiment, an integrated circuit includes a positive power supply node; a first current source couple to the positive power supply node; a second current source couple to the positive power supply node; an operational amplifier having a positive input, a negative input, and an output; and a first and a second NMOS transistor. The first NMOS transistor includes a first gate coupled to the output of the operation amplifier; a first source coupled to an electrical ground; and a first drain coupled to the positive input, wherein the first current source is coupled between the positive power supply node and the first drain. The second NMOS transistor includes a second gate coupled to the output of the operational amplifier; a second source coupled to the electrical ground; and a second drain, wherein the second current source is coupled between the positive power supply node and the second drain. The integrated circuit further includes a first capacitor having a first end coupled to the first drain and a second end coupled to the electrical ground; a second capacitor having a first end coupled to the second drain; and a resistor having a first end coupled to a second end of the second capacitor and a second end coupled to the electrical ground. The second capacitor and the resistor are coupled between the second source and the second drain.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The specific embodiments discussed are merely illustrative, and do not limit the scope of the invention.

Figure 1:
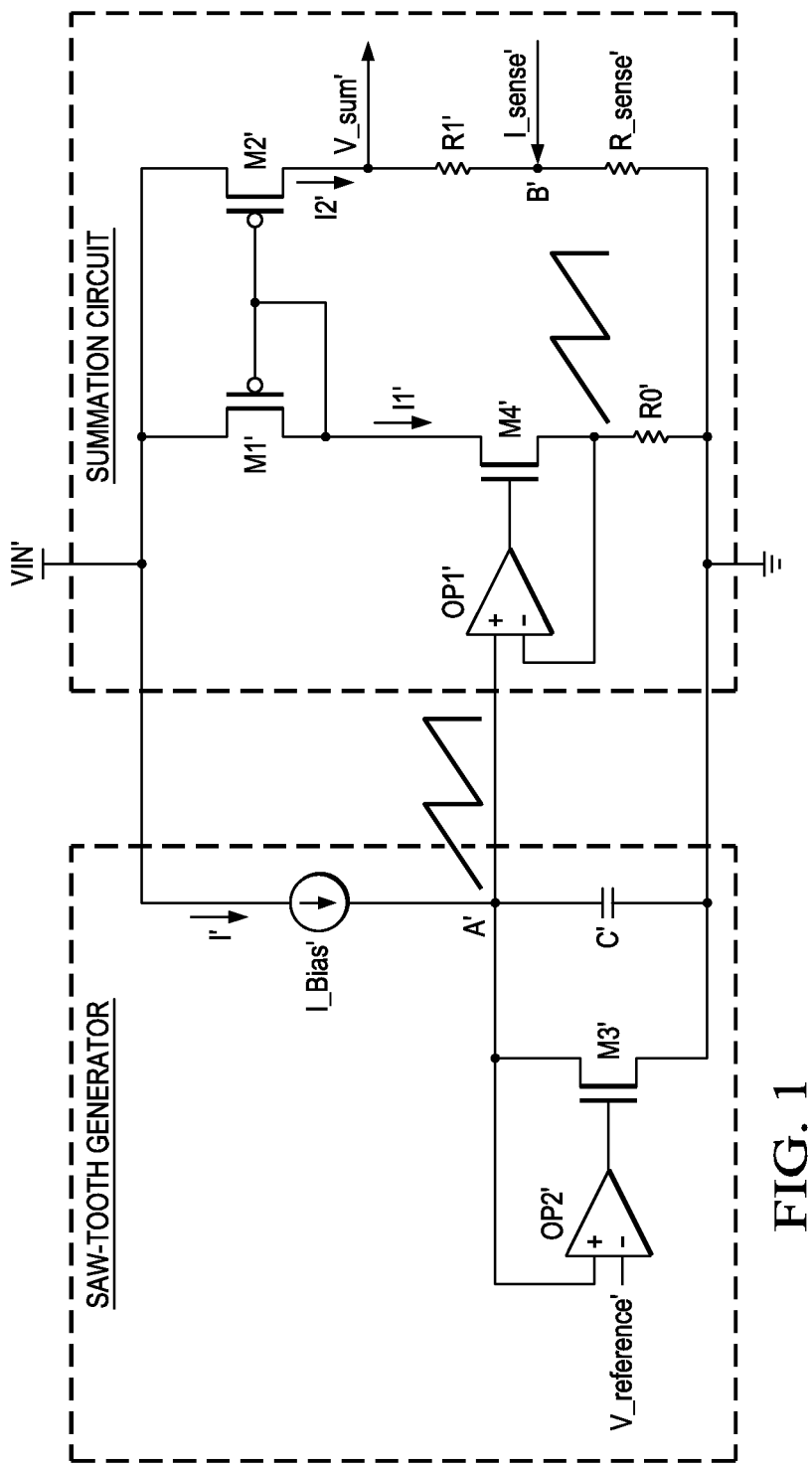
FIG. 1 illustrates a circuit diagram of a conventional saw-tooth generator and a summation circuit.
Figure 2:
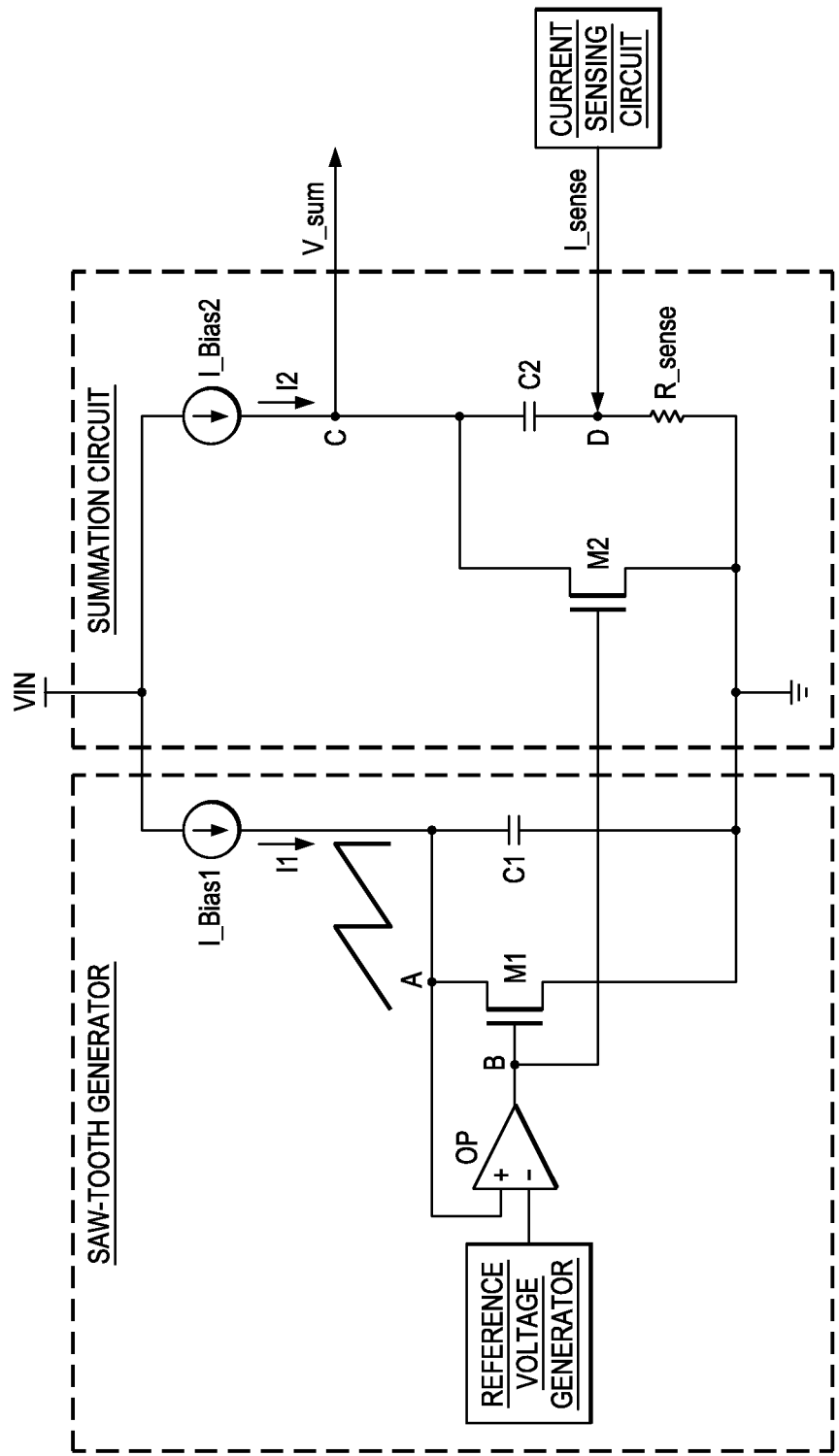
FIG. 2 illustrates a circuit diagram of a saw-tooth generator and a summation circuit in accordance with an embodiment.

FIG. 2 illustrates the circuit diagram of a saw-tooth generator and a summation circuit in accordance with an embodiment. The saw-tooth generator includes operational amplifier OP, transistor M1, capacitor C1, and current source I_Bias1, which is used to provide constant current I1. One end of current source I_Bias1 is connected to power supply node VIN that provides a positive power supply voltage. Transistor M1 acts as a switch, whose status is controlled by the output of operational amplifier OP. The gate of transistor M1 is hence referred to as the control node of the switch. The negative input of operational amplifier OP is connected to a reference voltage generator, which outputs a stable reference voltage V_ref to the negative input.

The operation of the saw-tooth generator is discussed as follows. Assuming at one time-point, voltage VA at node A is lower than reference voltage V_ref, operational amplifier OP outputs a low voltage lower than the threshold voltage of transistor M1, and hence transistor M1 is turned off. Current source I_Bias1 thus charges capacitor C1 with current I1. With current I1 being constant, the rising slope of the resulting voltage VA, which increases over time, is straight. The increase in voltage VA also means that the voltage at the positive input of operational amplifier OP increases, until at a time, voltage VB at node B exceeds the threshold voltage of transistor M1, so that transistor M1 is turned on. Accordingly, node A is shorted to an electrical ground, and voltage VA is reduced to the ground voltage. With voltage VA being at the ground voltage, operational amplifier OP outputs a low voltage to turn off transistor M1. The above-described cycles are repeated, and saw-tooth voltage VA is generated at node A. Throughout the description, voltage VA is also referred to as saw-tooth voltage Vsaw_tooth.

The summation circuit includes transistor M2, capacitor C2, and current source I_Bias2, which is used to provide constant current I2. One end of current source I_Bias2 is connected to positive power supply node VIN. Transistor M2 acts as a switch, whose status is also controlled by the output of operational amplifier OP. The output of operational amplifier OP is further connected to the gate (also referred to as the switch control node hereinafter) of NMOS transistor M2. The drain of NMOS transistor M2 is coupled to output node C of the summation circuit, and output voltage V_sum of the summation circuit is outputted at node C. The source of NMOS transistor M2 may be coupled to the electrical ground.

Current I_sense, which may be generated by a current sensing circuit of a DC-DC converter (not shown), is inputted to node D, and flows to the electrical ground through resistance R_sense. Current I_sense may be proportional to the output voltage of the DC-DC converter. Accordingly, current I_sense alone (not counting current I2) results in voltage drop I_sense×R_sense to be generated on resistor R_sense. On the other hand, since the gate of transistor M2 is connected to the same node B as the gate (the switch control node) of transistor M1, transistors M1 and M2 are turned on and off simultaneously. In other words, transistors M1 and M2 function synchronously. Assuming current I_sense does not exist, transistor M2 and capacitor C2 determine the charging and discharging of node C, so that voltage V_sum is also a saw-tooth voltage. Throughout the description, voltage V_compensation is used to refer to the voltage at node C assuming no current I_sense is flowing into node D. Since the voltage of a capacitor that is being charged by a constant charging-current is proportional to the charging-current, and inversely proportional to the capacitance of the capacitor, voltage V_compensation may be expressed as:

$$V\_compensation = V\text{saw\_tooth} \times (I2/I1) \times (C1/C2) \quad \text{[Eq. 2]}$$

wherein voltage Vsaw_tooth is the voltage at node A. Summation voltage V_sum equals the sum of compensation voltage V_compensation and voltage drop I_sense×R_sense, and may be expressed as:

$$V\_sum = V\_compensation + I\_sense \times R\_sense \quad \text{[Eq. 3]}$$

or $$V\_sum = V\text{saw\_tooth} \times (I2/I1) \times (C1/C2) + I\_sense \times R\_sense \quad \text{[Eq. 4]}$$

Equations 2-4 indicate that voltage V_compensation may duplicate saw-tooth voltage Vsaw_tooth proportionally and accurately. Further, by adjusting the ratio (I2/I1) and/or ratio (C1/C2), voltage V_compensation may be adjusted to a desirable proportion of saw-tooth voltage Vsaw_tooth. In an example embodiment, current I1 equals current I2, and capacitance C1 equals capacitance C2, and hence voltage V_compensation duplicates saw-tooth voltage Vsaw_tooth precisely. In other embodiments, capacitance C1 may be greater or smaller than capacitance C2, and/or current I1 may be greater or smaller than current I2.

In the above-discussed embodiments, the summation circuit does not require any operational amplifier. This results in not only the reduction in the power consumption and the required chip area of the summation circuit, but also the improvement in the transient response and the accuracy of the summation circuit. The embodiment may be used in buck DC-DC converters, boost DC-DC converters, and buck-boost DC-DC converters.

Although the example embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

What is claimed is:

1. A power supply comprising:
    a summation circuit comprising
        an output node,
        a current sense input node, a first switch coupled between the output node and a reference voltage node, the first switch comprising a control node configured to be coupled to a waveform generator, a first current source connected to the output node, a first capacitor coupled between the output node and the current sense input node, a first resistor coupled between the current sense input node and the reference voltage node, and a resistor coupled in series with a first capacitor, wherein the first capacitor and the resistor in combination are coupled in parallel with the first switch.

2. The power supply of claim 1, further comprising the waveform generator, the waveform generator comprising:

a waveform node configured to have a waveform voltage generated thereon; and a second switch comprising a first end coupled to the waveform node.

3. The power supply of claim 2, wherein the first switch and the second switch are configured to operate synchronously.

4. The power supply of claim 2, wherein the waveform voltage comprises a saw tooth voltage.

5. The power supply of claim 2, wherein the waveform generator further comprises a second capacitor coupled between the waveform node and the reference voltage node.

6. The power supply of claim 5, wherein the waveform generator further comprises an operational amplifier having an output coupled to a control node of the second switch, a negative input coupled to an output of a reference voltage generator and a positive input coupled to the waveform node.

7. The power supply of claim 6, wherein the reference voltage generator is configured to produce a constant reference voltage.

8. The power supply of claim 2, wherein the summation circuit and the waveform generator are disposed on an integrated circuit.

9. The power supply of claim 1, wherein the reference voltage node is a ground node.

10. The power supply of claim 1, further comprising a current sensing circuit having an output coupled to the current sense input node.

11. An integrated circuit comprising:

a summation circuit comprising an output node, a current sense input node configured to be coupled to a current sensing circuit of a power supply, a first switch coupled between the output node and an supply voltage node, the first switch comprising a control node configured to be coupled to a waveform generator;

a first current source connected to the output node, a first capacitor coupled between the output node and the current sense input node, a first resistor coupled between the current sense input node and the supply voltage node, and a resistor coupled in series with a first capacitor, wherein the first capacitor and the resistor in combination are coupled in parallel with the first switch; and a sawtooth generator comprising an amplifier having a first input coupled to a sawtooth node, a second input coupled to a reference voltage node, a second current source coupled to a sawtooth node, and a second switch coupled between the sawtooth node and the supply voltage node, the second switch a control node coupled to an output of the amplifier and to a control node of the first switch.

12. The integrated circuit of claim 11, wherein:

the supply voltage node is a ground node;

the amplifier is an operational amplifier;

the first current source comprises a constant current source; and the second current source comprises a constant current source.

13. The integrated circuit of claim 11, wherein:

the first switch comprises a first NMOS transistor; and the second switch comprises a second NMOS transistor.

14. The integrated circuit of claim 11, wherein:

a current output by the first current source is equal to a current output by the second current source; and the first capacitor and the second capacitor have a same capacitance.

15. A method of operating a power supply, the method comprising:

generating a first waveform voltage, generating the first waveform voltage comprising charging a first capacitor with a first current source and activating a first switch coupled to the first capacitor when the first waveform voltage crosses a first threshold; and generating a second waveform voltage, generating the second waveform voltage comprising charging a first circuit with a second current source and activating a second switch when the waveform voltage crosses the first threshold, wherein the first circuit comprises a second capacitor coupled in series with a resistor.

16. The method of claim 15, wherein generating the first waveform voltage comprises generating a sawtooth voltage.

17. The method of claim 15, further comprising summing a the second waveform voltage with a sensed current signal, summing comprising:

coupling an output of a current sensing circuit to a first node of the resistor; and producing an output voltage at an output node coupled an output of the second current source.

18. The method of claim 17, further comprising:

coupling the output of the current sensing circuit to a first end of the second capacitor; and coupling the output node to a second end of the second capacitor, the first end opposite the second end.

19. The method of claim 15, wherein activating the second switch comprises activating the second switch synchronously with the first switch.

20. The method of claim 15, wherein generating the first waveform voltage further comprises comparing the first waveform voltage with the first threshold using an operational amplifier.

* * * * *